US011356217B2

(12) United States Patent
Baldemair et al.

(10) Patent No.: US 11,356,217 B2
(45) Date of Patent: Jun. 7, 2022

(54) ACK/NACK TRANSMISSION STRATEGIES (71) Applicant: Telefonaktiebolaget LM Ericsson (publ), Stockholm (SE)

(72) Inventors: Robert Baldemair, Solna (SE); Stefan Parkvall, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/336,788

(22) PCT Filed: Nov. 3, 2017

(86) PCT No.: PCT/SE2017/051091
§ 371 (c)(1),
(2) Date: Mar. 26, 2019

(87) PCT Pub. No.: WO2018/084790
PCT Pub. Date: May 11, 2018

(65) Prior Publication Data
US 2019/0245661 A1 Aug. 8, 2019

Related U.S. Application Data (60) Provisional application No. 62/417,624, filed on Nov. 4, 2016.

(51) Int. Cl.
*H04L 5/00* (2006.01)
*H04L 1/18* (2006.01)
*H04L 1/16* (2006.01)

(52) U.S. Cl.
CPC .......... *H04L 5/0042* (2013.01); *H04L 1/1671* (2013.01); *H04L 1/1854* (2013.01);
(Continued)

(58) Field of Classification Search
CPC ....... H04L 1/1671; H04L 1/1812–1825; H04L 1/1887; H04L 1/1893; H04L 1/1896; H04L 5/0042; H04L 5/0053–0058
See application file for complete search history.

(56) References Cited

U.S. PATENT DOCUMENTS 10,182,467 B2   1/2019   Park
2008/0225788 A1   9/2008   Inoue et al.
(Continued)

FOREIGN PATENT DOCUMENTS

CN   101695017 A   4/2010
CN   102281133 A   12/2011
(Continued)

OTHER PUBLICATIONS

Examination Report for European Patent Application No. 17798008. 3, dated Feb. 13, 2019, 5 pages.
(Continued)

*Primary Examiner* — Pao Sinkantarakorn
(74) *Attorney, Agent, or Firm* — Withrow & Terranova, PLLC (57) ABSTRACT Methods and systems for Acknowledgement (ACK)/Negative Acknowledgement (NACK) transmission strategies are provided. According to one aspect, a method of operation of a radio node comprises determining whether a combination of resources for a plurality of signals or channels fulfills a predefined criteria: if so, the plurality of signals or channels are transmitted according to a first transmission strategy in which each signal or channel is transmitted on its respective resource or resources; if not, at least some of the plurality of signals or channels are transmitted according to a second transmission strategy different from the first transmission strategy, e.g., transmitting only a subset of the signals or channels, combining signals and channels, etc. The predefined criteria may be based on the characteristics of the
(Continued)

resources for the plurality of signals or channels, such as their locations, bandwidths, signal qualities, relative separation in the frequency domain, or other characteristics.

12 Claims, 6 Drawing Sheets (52) U.S. Cl.
CPC .......... *H04L 5/0007* (2013.01); *H04L 5/0055* (2013.01); *H04L 5/0057* (2013.01)

(56) References Cited

U.S. PATENT DOCUMENTS

| | | | |
|---|---|---|---|
| 2009/0245284 | A1 | 10/2009 | Xu et al. |
| 2010/0113057 | A1 | 5/2010 | Englund et al. |
| 2010/0309857 | A1* | 12/2010 | Kawamura ........... H04L 1/0027 |
| | | | 370/329 |
| 2011/0205981 | A1 | 8/2011 | Koo et al. |
| 2012/0039285 | A1 | 2/2012 | Seo et al. |
| 2012/0082157 | A1 | 4/2012 | Yamada et al. |
| 2012/0088533 | A1 | 4/2012 | Khoshnevis et al. |
| 2012/0243497 | A1 | 9/2012 | Chung et al. |
| 2014/0023011 | A1 | 1/2014 | Gao et al. |
| 2014/0219202 | A1 | 8/2014 | Kim et al. |
| 2014/0362792 | A1 | 12/2014 | Cheng et al. |
| 2015/0063136 | A1 | 3/2015 | Shen et al. |
| 2015/0215942 | A1 | 7/2015 | Han et al. |
| 2015/0358111 | A1 | 12/2015 | Marinier et al. |
| 2016/0183244 | A1 | 6/2016 | Papasakellariou |

FOREIGN PATENT DOCUMENTS

| | | |
|---|---|---|
| CN | 102300307 A | 12/2011 |
| CN | 102448113 A | 5/2012 |
| CN | 102948103 A | 2/2013 |
| CN | 103068047 A | 4/2013 |
| CN | 103108398 A | 5/2013 |
| CN | 103209483 A | 7/2013 |
| CN | 103283286 A | 9/2013 |
| CN | 103701559 A | 4/2014 |
| EP | 2214335 A1 | 4/2010 |
| EP | 2357735 A2 | 8/2011 |
| EP | 2760171 A2 | 7/2014 |
| WO | 2010148319 A1 | 12/2010 |
| WO | 2016123372 A1 | 8/2016 |
| WO | 2016162803 A1 | 10/2016 |
| WO | 2017050062 A1 | 3/2017 |
| WO | 2018084791 A1 | 5/2018 |

OTHER PUBLICATIONS

Examination Report for European Patent Application No. 17798008.3, dated May 7, 2019, 5 pages.

Fraser, Sandy, "LTE Channel State Information (CSI)," Agilent in Wireless Communications, Agilent Technologies, Wireless Communications, May 13, 2012, URL: https://www.keysight.com/upload/cmc_upload/All/31May2012_LTE.pdf, retrieved Nov. 1, 2016, 66 pages.

LG Electronics, "R1-1613036: Discussion on 2-HARQ process for eNB-IoT," Third Generation Partnership Project (3GPP), TSG RAN WG1 Meeting #87, Nov. 14-18, 2016, 3 pages, Reno, USA.

International Search Report and Written Opinion for International Patent Application No. PCT/SE2017/051091, dated Mar. 19, 2018, 15 pages.

International Search Report and Written Opinion for International Patent Application No. PCT/SE2017/051092, dated Feb. 1, 2018, 12 pages.

International Preliminary Report on Patentability for International Patent Application No. PCT/SE2017/051092, dated Oct. 12, 2018, 15 pages.

Non-Final Office Action for U.S. Appl. No. 16/336,810, dated Jun. 1, 2020, 12 pages.

Extended European Search Report for European Patent Application No. 17867995.7, dated May 27, 2020, 9 pages.

Examination Report for Indian Patent Application No. 201947017513, dated Dec. 14, 2020, 6 pages.

CMCC, "R1-094037: UL ACK/NACK and CQI feedback in Carrier Aggregation," 3GPP TSG RAN WG1 Meeting #58-bis, Oct. 12-16, 2009, 4 pages.

Wang, Dan, et al., "Efficient Receiver Scheme for LTE PUCCH," IEEE Comunications Letters, vol. 16, Issue 3, Mar. 2012, pp. 352-355.

Yu, "Transmit Diversity Study Based on LTE—A System," Mar. 2013, 72 pages (english abstract included).

First Office Action for Chinese Patent Application No. 201780068287.3, dated Jun. 25, 2021, 11 pages.

First Office Action for Chinese Patent Application No. 201780068516.1, dated Jun. 28, 2021, 10 pages.

Examination Report for Indian Patent Application No. 201947017538, dated Apr. 19, 2021, 6 pages.

* cited by examiner

ACK/NACK TRANSMISSION STRATEGIES

RELATED APPLICATIONS

This application is a 35 U.S.C. § 371 national phase filing of International Application No. PCT/SE2017/051091, filed Nov. 3, 2017, which claims the benefit of provisional patent application Ser. No. 62/417,624, filed Nov. 4, 2016, the disclosures of which are hereby incorporated herein by reference in its entirety their entireties.

TECHNICAL FIELD

The present disclosure relates to physical layer control signaling of a radio node operating within wireless communications networks, including transmission of Channel Quality Indicator (CQI) and Hybrid Automatic Repeat Requests (HARQs).

BACKGROUND

To mitigate the Peak to Average Power Ratio per Cubic Metric (PAPR/CM) disadvantage of Orthogonal Frequency Division Multiplexing (OFDM), the input to the OFDM modulator can be precoded by a Discrete Fourier Transform (DFT). This results in lower PAPR/CM of the waveform generated by the OFDM modulator. The combination of DFT-precoder and OFDM modulation is called DFT Spread OFDM (DFT-S-OFDM) (sometimes also referred to as Single Carrier Frequency Division Multiple Access, or SC-FDMA). This scheme can enable higher power amplifier utilization and less power amplifier backup. A drawback of DFT-S-OFDM is worse performance over frequency selective channels, more complicated receivers, and the fact that it is limited to contiguous frequency domain resources.

Channel Quality Indicator (CQI) feedback is needed to inform a transmitter about channel quality at the receiving end. In Long Term Evolution (LTE), two kinds of CQI feedback are distinguished: periodic CQI feedback (also referred to as "periodic CQI") and aperiodic CQI feedback (also referred to as "aperiodic CQI").

In aperiodic CQI the transmitting node explicitly requests a transmission of CQI feedback. The triggering may happen via a triggering bit in a Downlink Control Information (DCI) message. If the triggering is done in an uplink grant, e.g., for scheduled data, the scheduler can adjust the size of the scheduled resource to accommodate both the uplink data and the CQI feedback.

Periodic CQI is semi-statically configured and occurs at periodic instances. Together with the time pattern also a periodic resource is configured which should be used for the periodic CQI reporting.

LTE uses a Hybrid Automatic Repeat Request (HARQ) protocol where the receiver informs the transmitter about success (i.e., Acknowledgement (ACK))/no success (i.e., Negative Acknowledgement (NACK)) of the corresponding transmission. The resources for ACK/NACK transmission are typically signaled as a combination of dynamic signaling (in the DCI message) and semi-statically configured parameters.

LTE uses one HARQ ACK/NACK feedback bit per transport block. In case of spatial bundling, feedback of two Multiple Input Multiple Output (MIMO) transport blocks can be bundled (e.g., using a logical AND operation) into a single value. Furthermore, in case of Carrier Aggregation (CA) it is often the case that more downlink carriers are configured than uplink carriers and/or HARQ feedback transmission may even be limited to a single component carrier. Also in a Time Division Duplexing (TDD) protocol having more downlink than uplink slots, HARQ feedback of multiple downlink slots must be conveyed in fewer uplink slots. Depending on the configuration, a few bits (e.g., Frequency Division Duplexing (FDD) without carrier aggregation) or many bits (e.g., TDD with downlink-heavy carrier aggregation) must be conveyed per feedback occurrence. Also, operations in unlicensed bands can increase the number of HARQ feedback bits.

Aperiodic CQI is only transmitted if Physical Uplink Shared Channel (PUSCH) resources are scheduled. If aperiodic CQI should be transmitted together with ACK/NACK this is done on PUSCH since PUSCH resources are available anyway.

In conventional systems including LTE, different methods are applied for periodic CQI feedback together with HARQ, depending on the HARQ feedback size:

Physical Uplink Control Channel (PUCCH) Format 2a/2b: For one or two HARQ feedback bits, the CQI can either be dropped or transmitted together with the HARQ feedback on CQI resources. For larger ACK/NACK feedback sizes, the CQI is dropped since neither the ACK/NACK resources nor the CQI resources are sufficient to accommodate both feedback types and ACK/NACK feedback is transmitted on ACK/NACK resources.

PUCCH Format 3: If combined payload size of ACK/NACK, the Channel State Information (CSI), and Scheduling Request (SR) is less or equal to 22 bits, the combined payload is transmitted using PUCCH Format 3. If the combined payload exceeds 22 bits, spatially bundling is applied to the ACK/NACK bits. If the combined payload size of spatially bundled ACK/NACK, CSI, and SR is less or equal to 22 bits, spatially bundled ACK/NACK, CSI, and SR is transmitted using PUCCH Format 3. Otherwise CSI is dropped and ACK/NACK, together with SR, is transmitted using PUCCH Format 3.

PUCCH Format 4 and 5 use similar procedures as PUCCH Format 3.

SUMMARY

According to one aspect of the present disclosure, a method of operation of a radio node comprises determining whether a combination of resources for a plurality of signals or channels fulfills a predefined criteria. Upon a determination that the predefined criteria is fulfilled, the method includes transmitting the plurality of signals or channels according to a first transmission strategy wherein each of the plurality of signals or channels is transmitted on its respective resource or resources.

In some embodiments, the method further comprises, upon a determination that the predefined criteria is not fulfilled, transmitting at least some of the plurality of signals or channels according to a second transmission strategy different from the first transmission strategy.

In some embodiments, transmitting at least some of the plurality of signals or channels according to the second transmission strategy comprises transmitting less than all of the plurality of signals or channels on less than all of the resources associated with the plurality of signals or channels.

In some embodiments, transmitting at least some of the plurality of signals or channels according to the second transmission strategy comprises combining at least some of the plurality of signals or channels and transmitting the combination on less than all of the resources associated with the plurality of signals or channels.

In some embodiments, transmitting at least some of the plurality of signals or channels according to the second transmission strategy comprises transmitting at least one of the plurality of signals or channels in a reduced or compacted form.

In some embodiments, one of the predefined criteria is that a normalized span of the combination of resources is below a predefined threshold.

In some embodiments, one of the predefined criteria is that the normalized span of the combination of resources is within a predefined threshold percentage of a normalized User Equipment (UE) bandwidth or carrier bandwidth.

In some embodiments, one of the predefined criteria is that a normalized separation of the combination of resources is below a threshold.

In some embodiments, one of the predefined criteria is that Orthogonal Frequency Division Multiplexing (OFDM) is used for transmission of data.

In some embodiments, one of the predefined criteria is based on a characteristic of the combination of resources, the characteristic comprising a frequency of a resource, a bandwidth of the resource, a signal quality of the resource, or a relative separation of a set of resources in a frequency domain.

In some embodiments, one of the predefined criteria is that a transmission power of the radio node (14) is below a predefined threshold.

In some embodiments, the radio node uses a power headroom report to estimate transmission power.

In some embodiments, one of the plurality of signals or channels is related to a Channel Quality Indicator (CQI) transmission.

In some embodiments, one of the plurality of signals or channels is related to Acknowledgment (ACK)/Negative Acknowledgement (NACK) transmission.

In some embodiments, the plurality of signals or channels comprises three or more signals or channels.

In some embodiments, the method further comprises, prior to the determining step, receiving or being provisioned with the predefined criteria.

In some embodiments, a transmission scheme associated with the first transmission strategy is different from a transmission scheme associated with the second transmission strategy.

In some embodiments, a transmission scheme comprises at least one of: Orthogonal Frequency Division Multiplexing (OFDM); and Discrete Fourier Transform Spread OFDM (DFT-S-OFDM).

According to another aspect of the present disclosure, a radio node is adapted to operate according to any of the methods described above.

According to another aspect of the present disclosure, a radio node comprises at least one processor and memory comprising instructions executable by the at least one processor, whereby the radio node is operable to determine whether a combination of resources for a plurality of signals or channels fulfills a predefined criteria. Upon a determination that the predefined criteria is fulfilled, the radio node transmits the plurality of signals or channels according to a first transmission strategy wherein each of the plurality of signals or channels is transmitted on its respective resource or resources. Upon a determination that the predefined criteria is not fulfilled, the radio node transmits at least some of the plurality of signals or channels according to a second transmission strategy different from the first transmission strategy.

In some embodiments, transmitting at least some of the plurality of signals or channels according to the second transmission strategy comprises transmitting less than all of the plurality of signals or channels on less than all of the resources associated with the plurality of signals or channels.

In some embodiments, transmitting at least some of the plurality of signals or channels according to the second transmission strategy comprises combining at least some of the plurality of signals or channels and transmitting the combination on less than all of the resources associated with the plurality of signals or channels.

In some embodiments, transmitting at least some of the plurality of signals or channels according to the second transmission strategy comprises transmitting at least one of the plurality of signals or channels in a reduced or compacted form.

In some embodiments, one of the predefined criteria is that a normalized span of the combination of resources is below a predefined threshold.

In some embodiments, one of the predefined criteria is that the normalized span of the combination of resources is within a predefined threshold percentage of a normalized UE bandwidth or carrier bandwidth.

In some embodiments, one of the predefined criteria is that the normalized separation of the combined resources is below a threshold.

In some embodiments, one of the predefined criteria is that Orthogonal Frequency Division Multiplexing (OFDM) is used for transmission of data.

In some embodiments, one of the predefined criteria is based on a characteristic of the combination of resources, the characteristic comprising a frequency of a resource, a bandwidth of the resource, a signal quality of the resource, or a relative separation of a set of resources in a frequency domain.

In some embodiments, one of the predefined criteria is that a transmission power of the radio node is below a predefined threshold.

In some embodiments, the radio node uses a power headroom report to estimate transmission power.

In some embodiments, one of the plurality of signals or channels is related to a Channel Quality Indicator (CQI) transmission.

In some embodiments, one of the plurality of signals or channels is related to ACK/NACK transmission.

In some embodiments, the plurality of signals or channels comprises three or more signals or channels.

In some embodiments, a transmission scheme associated with the first transmission strategy is different from a transmission scheme associated with the second transmission strategy.

In some embodiments, a transmission scheme comprises at least one of Orthogonal Frequency Division Multiplexing (OFDM); and Discrete Fourier Transform Spread OFDM (DFT-S-OFDM).

According to another aspect of the present disclosure, a method of operation of a radio node comprises determining whether a second radio node will transmit a plurality of signals or channels according to a first transmission strategy wherein each of the plurality of signals or channels is transmitted on its respective resource or resources or whether the second radio node will transmit one or more signals or channels according to a second transmission strategy different from the first transmission strategy. The method further comprises receiving the one or more signals or channels from the second radio node, and processing the received one or more signals or channels according to the determination.

In some embodiments, the radio node comprises a New Radio Base Station (gNB), an Enhanced or Evolved Node B (eNB), or a base station.

In some embodiments, the radio node comprises a wireless device operating according to a Device-to-Device (D2D), Machine-to-Machine (M2M), or Machine Type Communication (MTC) protocol.

In some embodiments, the one or more signals or channels comprises a periodic CQI feedback, a Hybrid Automatic Repeat Request (HARQ) feedback, or both.

According to another aspect of the present disclosure, a radio node is adapted to operate according to any of the methods described above.

According to another aspect of the present disclosure, a radio node comprises at least one processor and memory comprising instructions executable by the at least one processor whereby the radio node is operable to determine whether a second radio node will transmit a plurality of signals or channels according to a first transmission strategy wherein each of the plurality of signals or channels is transmitted on its respective resource or resources or whether the second radio node will transmit one or more signals or channels according to a second transmission strategy different from the first transmission strategy. The radio node is further operable to receive one or more signals or channels from the second radio node, and process the one or more signals or channels according to the determined strategy.

In some embodiments, the radio node comprises a gNB, an eNB, or a base station.

In some embodiments, the radio node comprises a wireless device operating according to a D2D, M2M, or MTC protocol.

In some embodiment, the one or more signals or channels comprises a periodic CQI feedback, a HARQ feedback, or both.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Combined resources: As used herein, the term "combined resources," or alternatively, "combined transmission resources," refers to the collection of time/frequency resources used to transmit a set of signals or channels. A combination of resources need not be contiguous in time or frequency with each other. Where each of the separate signals or channels occupies its own distinct set of transmission resources, the term "combined resources" refers to the collection that includes all of the distinct sets. In some cases, multiple separate signals or channels may be mathematically or otherwise combined and transmitted using the resources usually used for only some of (or even just one of) the separate signals.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an Enhanced or Evolved Node B (eNB) in a 3GPP Long Term Evolution (LTE) network), a high-power or macro base station, a low-power base station (e.g., a micro base station, a pico base station, a home eNB, or the like), a relay node, an access point, a radio access point, a Remote Radio Unit (RRU), Remote Radio Head (RRH), a core network node (e.g., a Trace Collection Entity (TCE), a Mobility Management Entity (MME), a Minimization of Drive Tests (MDT) node, a Multimedia Broadcast/Multicast Service (MBMS) node), or even an external node (e.g., a third party node, a node external to the current network), etc. A radio access node may be a Transmission and Reception Point (TRP), especially one that uses self-backhauling to wirelessly communicate to another node, or other network node allowing communication with a network.

Core Network Node: As used herein, a "core network node" is any type of node in a core network. Some examples of a core network node include, e.g., a MME, a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device. A UE or wireless device may additionally represent a target device, a Device-to-Device (D2D) UE, a machine type UE, or a UE capable of Machine-to-Machine (M2M) communication, a sensor equipped with a UE, an iPAD, a tablet, a mobile terminal, a smart phone, Laptop Embedded Equipped (LEE), Laptop Mounted Equipment (LME), Universal Serial Bus (USB) dongles, Customer Premises Equipment (CPE), an Internet of Things (IoT) capable device, a device capable of communicating with a 5G and/or NR network, etc.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

A radio node, which may be a wireless device, such as a UE, determines if its combined transmission resources for periodic Channel Quality Indicator (CQI) and Acknowledgement (ACK)/Negative Acknowledgement (NACK) fulfill a certain criteria to be "Radio Frequency (RF) friendly." If yes, the radio node transmits periodic CQI and ACK/NACK feedback simultaneously on their respective resource. If it is determined that the combined transmission resources for periodic CQI and ACK/NACK are not "RF friendly," the radio node will either drop or reduce one of the payload types or transmit a combined/reduced report on one of the resources. A determination of whether or not the combined resources are "RF friendly" may be based on their frequency profiles, such as the bandwidth of each frequency "island," the separation between the frequency islands in the frequency domain, signal quality within the frequency "islands," and/or other characteristics.

The subject matter presented herein has the advantage that it provides possible opportunities for the CQI bits to be transmitted on their own respective resources rather than having to be combined with the ACK/NACK feedback and potentially dropped for lack of space. As a result, periodic CQI bits are less often (or perhaps never) dropped, which avoids the problem of the transmitter having only outdated CQI information. This improves link adaptation and increases throughput.

Figure 1A:
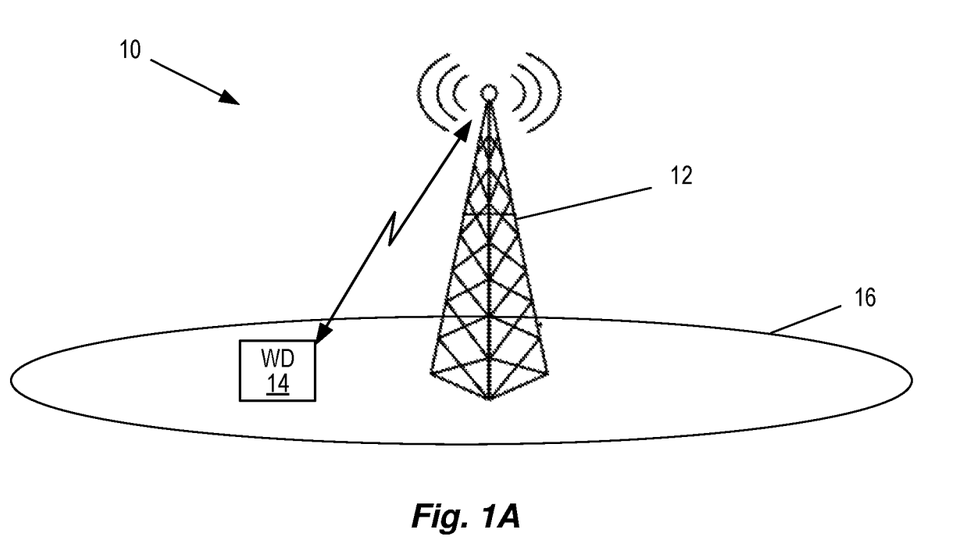
FIGS. 1A and 1B illustrate wireless communication systems according to some embodiments of the present disclosure.

FIG. 1A illustrates a wireless communication system according to some embodiments of the present disclosure. In this regard, FIG. 1A illustrates one example of a wireless system 10 (e.g., a cellular communications system) in which embodiments of the present disclosure may be implemented. The wireless system 10 includes a first radio node 12, which in this example is a radio access node and therefore may be also referred to herein as the "radio access node 12." However, the first radio node 12 is not limited to a radio access node and can be another device such as a general radio node allowing communication within a radio network, including a wireless device as described below.

In the embodiment illustrated in FIG. 1A, the radio access node 12 provides wireless access to other radio nodes 14 within a coverage area 16 (e.g., cell) of the radio access node 12. In the embodiment illustrated in FIG. 1A, the radio access node 12 provides radio access to a second radio node 14, which in this example is a wireless device (WD) and therefore may also be referred to herein as the "wireless device 14" or "WD 14." In some embodiments, the second node 14 is a LTE UE. Note that the term "UE" is used herein in its broad sense to mean any wireless device. As such, the terms "wireless device" and "UE" are used interchangeably herein.

For simultaneous feedback of periodic CQI and large Hybrid Automatic Repeat Request (HARQ) feedback sizes the CQI bits are dropped which leads to outdated CQI information at the transmitter. Outdated CQI information leads to less efficient link adaptation and reduced throughput. Thus, it is desired to avoid dropping CQI bits if possible.

NR uplink supports both Discrete Fourier Transform Spread Orthogonal Frequency Division Multiplexing (DFT-S-OFDM) and Orthogonal Frequency Division Multiplexing (OFDM) as transmission scheme, at least for data. While DFT-S-OFDM requires contiguous transmission resources (at least to fully reach its Peak to Average Power Ratio or Cubic Metric (PAPR/CM) potential) OFDM has no such limitation. The requirement of contiguous resource allocations in DFT-S-OFDM scheme is the reason to drop one of the payload types or transmit multiple payload types (e.g., periodic CQI and ACK/NACK feedback bits) on one resource instead of transmitting each payload type on its own resource. At least in principle, OFDM has no such limitation.

In OFDM, transmission resources don't have to be contiguous. This enables matching of the transmission resources to the channel quality (e.g., to skip resource with low Signal to Interference plus Noise Ratio (SINR)) or it also allows transmission of signals/channels on independently allocated resources for each signal/channel. The latter could, e.g., apply to simultaneous feedback of periodic CQI and ACK/NACK feedback. Resources for periodic CQI are typically semi-statically configured. Resources for ACK/NACK feedback on the other side are at least partly dynamic assigned, e.g., via an indicator in a Downlink Control Information (DCI) message or implicitly derived from the scheduling command. In OFDM—where resources don't have to be contiguous—it is feasible to transmit periodic CQI and ACK/NACK feedback simultaneously in the same OFDM symbol.

The same concepts described herein may also be applied to other forms of wireless communication, including, but not limited to, D2D communications. An example of this is shown in FIG. 1B.

Figure 1B:
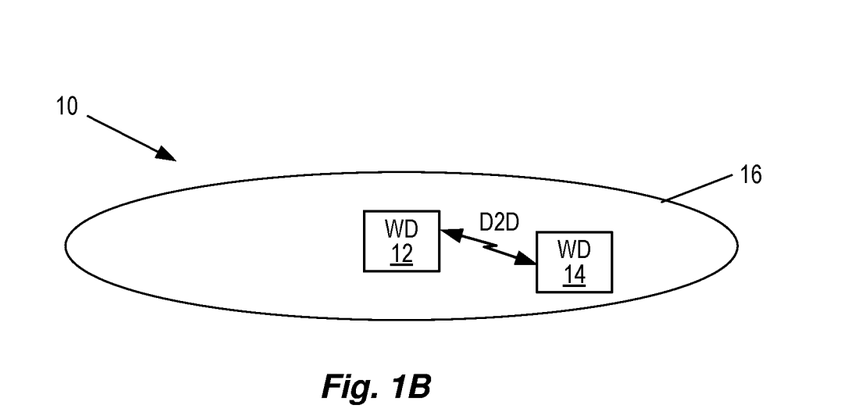

FIG. 1B illustrates a wireless communication system according to other embodiments of the present disclosure. In this regard, FIG. 1B illustrates one example of a wireless system 10 in which the first radio node 12 is also a wireless device that is operating according to a D2D, M2M, or MTC protocol.

Figure 2:
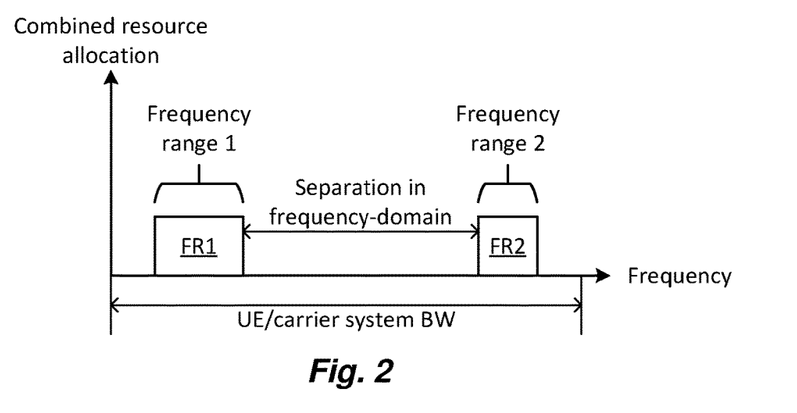
FIG. 2 illustrates resource allocations with wide frequency domain separation that can lead to high out-of-band emissions.

FIG. 2 illustrates resource allocations with wide frequency domain separation that can lead to high out-of-band emissions. In FIG. 2, the X-axis is frequency, with the UE and/or carrier system bandwidth (BW) marked. FIG. 2 illustrates the scenario where assigned transmission resources are concentrated in two (or more) "islands" representing frequency ranges, labeled FR1 and FR2 respectively. If the assigned transmission resources look like as in FIG. 2, i.e. concentrated in some frequency ranges with a large separation from each other in the frequency domain, then non-linear inter-modulation products occur in non-linear devices (e.g., power amplifiers). These inter-modulation products can lead to high out-of-band emissions and may require large reductions in power ("power backoffs"). Therefore, even for OFDM it is advantageous to avoid such resource allocations, especially if the UE has to transmit with high power levels. Note that FIG. 2 shows a simplified picture; the same problem occurs if the resources are distributed within an island and/or contain more than two islands.

Figure 3:
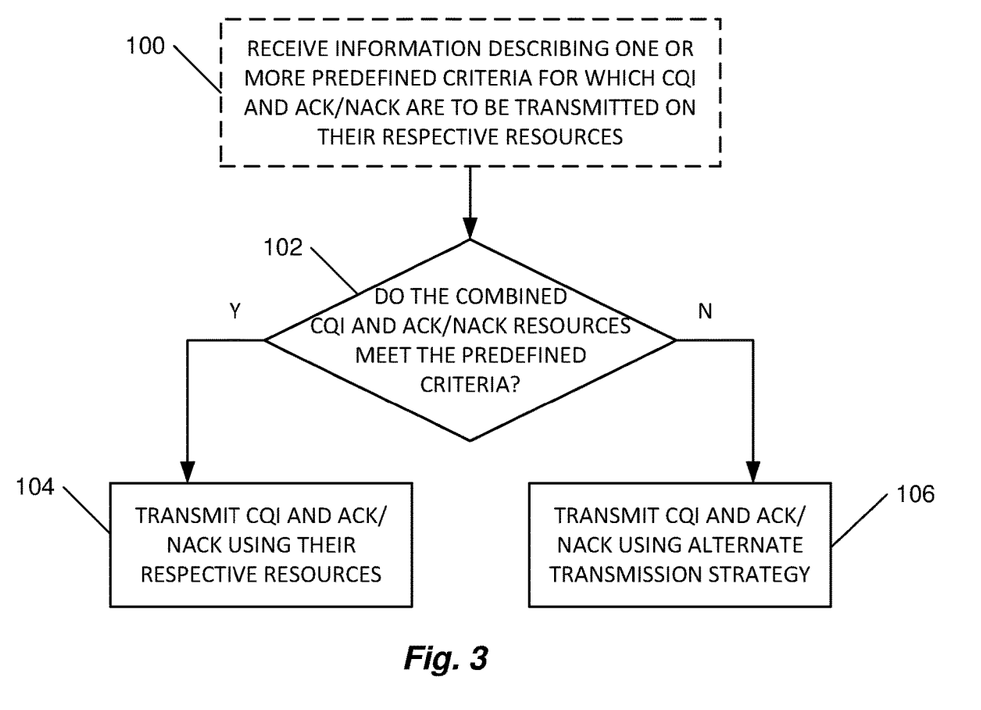
FIG. 3 illustrates a procedure for transmitting Channel Quality Indicator (CQI) and Hybrid Automatic Repeat Request (HARQ) Acknowledgement (ACK)/Negative Acknowledgement (NACK) according to some embodiments of the present disclosure.

FIG. 3 illustrates a procedure for transmitting CQI and HARQ ACK/NACK according to some embodiments of the present disclosure. The subject matter described herein proposes to transmit periodic CQI and ACK/NACK feedback on their respective resource, provided that their separation in frequency domain does not exceed a certain threshold. For too large separations ACK/NACK and CQI are either transmitted on a single resource (potentially reduced in size) or one of the payload types is dropped.

In the embodiment illustrated in FIG. 3, for example, a UE is provided with information about predefined criteria for which CQI and ACK/NACK are to be transmitted on their respective resources (step 100). This may also be referred to as receiving information describing a defined class or condition under which each of the signals or channels is to be transmitted on its respective resource or resources. In this manner the UE is informed about the classification when the UE should transmit periodic CQI and ACK/NACK on their respective resource and when the UE should use the alternative transmission strategy. Informing the UE can either be handled via hardcoded in the standard or via semi-static configuration (e.g., via Radio Resource Control (RRC) signaling). This may happen just once, after which the UE maintains this information, obviating the need to notify the UE again and again. Thus, step 100 is shown as a box with a dotted outline.

As used herein, the terms "[pre]defined condition," "[pre]defined criteria," and "[pre]defined class" are used synonymously. Likewise, the phrases "satisfying a predefined criteria," "meeting a predefined condition," "being of a predefined class," "falling into a defined class," and the like, are used synonymously.

A variety of criteria may be considered when determining a transmission strategy to employ when transmitting the signals or channels. Examples of criteria include, but are not limited to, the bandwidth of each frequency range or "island" allocated for transmitting the signals or channels; the separation between two different frequency ranges; the position or location of a frequency range within the total bandwidth supported by the carrier; the position or location of a frequency range within the total bandwidth supported by the carrier; the transmission power of the signal or channels within a frequency range; and signal quality within a frequency range.

One or more of the above-mentioned criteria may be used to define a predefined condition that triggers the selection of one transmission strategy over another transmission strategy. For the purpose of illustration, assume that a first transmission strategy is to transmit each signal or channel on its respective resource or resources (e.g., each signal or channel occupies a separate frequency range or "island"), and a second transmission strategy may be that, for at least one of the signals or channels, only a portion of that signal or channel is transmitted within its frequency range or island. In another embodiment, for example, the second transmission strategy might be to transmit a select subset of the signals or channels within one frequency range or island.

Using this example, the first transmission strategy may be the default strategy, and the second transmission strategy may be used instead if any of the following conditions or combinations thereof occur (these examples are intended to be illustrative and not limiting):

The separation between the two frequency ranges is greater than a first threshold amount;

At least one of the frequency ranges is within a second threshold amount distance from the upper or lower bound of the frequency range supported by the UE;

At least one of the frequency ranges is within a second threshold amount distance from the upper or lower bound of the frequency range supported by the carrier;

At least one of the frequency ranges has a bandwidth above a third threshold amount;

The transmit power within at least one of the frequency ranges is above a fourth threshold amount;

The signal quality of at least one signal or channel is below a fifth threshold amount; and The location of one signal within one of the frequency ranges is more than a sixth threshold amount distance from another signal within the same frequency range.

The threshold values for separation, distance, bandwidth, and/or power may be defined in absolute terms, in relative terms, and/or in normalized terms. For example, the first threshold (for separation of the two frequency ranges) may be defined in absolute terms (e.g., 500 MHz), relative terms (e.g., 2 times the bandwidth of the largest island), or normalized terms. Examples of normalized terms include, but are not limited to: a maximum center-center-distance of the outermost frequency ranges divided by the UE bandwidth; a maximum bandwidth span (highest frequency of highest resource minus lowest frequency of lowest resource) divided by the UE bandwidth; the maximum center-center-distance of outermost frequency ranges (or maximum bandwidth span) divided by the (smaller) distance between a carrier edge and the closest resource edge.

One or more criteria and/or conditions may be combined to define a class, and identification of the signals or channels as belonging to a particular class may trigger the use of one transmission strategy or another transmission strategy. For example, a scenario where the separation between two frequency ranges is greater than separation threshold may be classified as "not RF friendly," unless the signals or channels in each of the two frequency ranges are below a power threshold, in which case the scenario may be classified as "RF friendly," In another example, the classification of a scenario as "RF friendly" may depend upon several factors, including the proximity of two frequency islands to each other as well as to the frequency limits of the carrier or the UE, and also transmission power of each of the islands.

It is noted that the examples above are intended to be illustrative and not limiting. Other criteria, conditions, and/or classes may be defined and are considered to be within the scope of the present disclosure.

At step 102, it is determined whether or not the combined CQI and ACK/NACK resources to be transmitted fall into the defined class or meet the defined condition. If so, the CQI and ACK/NACK are transmitted using their respective resources (step 104); if not, the CQI and ACK/NACK are transmitted using an alternative transmission strategy (step 106), such as dropping the CQI and transmitting only the ACK/NACK, etc. Thus, if the resource allocation of a UE does not fit into the defined category it adopts another transmission strategy. This strategy could be to drop either the periodic CQI or the HARQ ACK/NACK feedback, or transmit the combined payload on a single resource (e.g., the periodic CQI or ACK/NACK resource). It is furthermore possible to reduce the payload, e.g., perform ACK/NACK bundling, or transmit a reduced CQI report. We call this the alternative transmission strategy. In one embodiment, the transmission scheme, e.g., whether to use OFDM versus DFT-S-OFDM, etc., used for one transmission strategy may be different from a transmission scheme used for another transmission strategy. Other aspects may differ between one transmission strategy and another transmission strategy.

Thus, in one embodiment, when a UE needs to report periodic CQI together with HARQ feedback, it checks if the combined resources of periodic CQI and ACK/NACK fall within the first class, and if yes, it transmits periodic CQI and ACK/NACK on their respective resource. If the combined resources don't fall within the first class, the UE uses the alternative transmission strategy.

It will be understood that, although the previous example dealt with only two sets of resources, the same principles may be extended to cover any number of sets of resources. In one embodiment, for example, there may be multiple sets of resources (e.g., like the situation shown in FIG. 2 but with additional frequency ranges [FR3, FR4, . . . ]). In such embodiments, signals can be dropped and/or reduced until the remaining signals are sufficiently small. In one embodiment, the signals may be dropped/reduced according to an order of priority. Alternatively, signals may be dropped or reduced in order according to signal quality, e.g., with signals of lower quality being dropped or reduced before signals of higher quality.

Even though the description focuses on periodic CQI and ACK/NACK feedback, the same idea can be applied to any number of signal/channel types that need to be transmitted simultaneously.

The subject matter presented herein has the advantage that it provides possible opportunities for the CQI bits to be transmitted on their own respective resources rather than having to be combined with the ACK/NACK feedback and potentially dropped for lack of space. As a result, periodic CQI bits are less often (or perhaps never) dropped, which avoids the problem of the transmitter having only outdated CQI information. This improves link adaptation and increases throughput.

This invention therefore proposes to simultaneously transmit periodic CQI and ACK/NACK feedback on each of their respective resource as long as the combined resource allocation is within one class of resource allocation pattern. In the simplest case, all contiguous resource allocation and resource allocations similar to FIG. 2 with a frequency domain separation below a threshold fall into this first class. More complicated pattern/classifications can be envisioned as well, where the classification depends on multiple parameters or criteria, e.g., separation, bandwidth of each "island," allocation of resources within UE/carrier system bandwidth, etc. Smaller separation in frequency domain resource allocation in the middle of UE/carrier system bandwidth lead to lower out-of-band emissions compared to wider separations or transmissions at the edge.

It is also possible to include transmission power into the classification. E.g., if a UE transmits with lower transmission power, wider separation in frequency domain or allocations closer to UE/carrier system bandwidth edge are okay compared to if the UE transmits with higher power. Higher power magnifies the problem of wide separations or transmissions at the bandwidth edge. Thus, classification may be based on any number of criteria, and is not limited to only the criteria of separation, bandwidth of each island, location or position of the resources within the UE/carrier system bandwidth, and transmission power mentioned above.

NR will support DFT-S-OFDM and OFDM as transmission schemes for the uplink, at least for data. The transmission scheme could be yet another classification criteria (either as a stand-alone criteria or combined with any of the above). In the simplest case, if the UE uses OFDM for data it transmits periodic CQI and ACK/NACK feedback on their respective resources. In a preferred embodiment, the UE would combine the choice of transmission scheme together with any of the previously mentioned criteria.

We note that the classification so far is based on the combined resources of periodic CQI and ACK/NACK. If a UE should transmit a third signal/channel simultaneously, then in an optional embodiment, the resources of the third transmission should also be considered in the classification process. Likewise, although the invention has thus far been outlined for simultaneous transmission of periodic CQI and ACK/NACK feedback, the transmission can be generalized to other and more channels and signals.

In case of three or more signal/channel types with independent resource allocations, one could imagine a resource allocation with multiple resource islands. Classification, if simultaneous transmission of all or multiple signal/channels is possible, could, e.g., be done based on the maximum (normalized) separation between islands or separation between outermost islands. If simultaneous transmission of all signals/channels is feasible, all signals/channels are transmitted. If this is not possible, different strategies are possible to determine what to transmit:

All resources but one resource is dropped. Which signals/channels are dropped and which are transmitted (potentially reduced in size) on the single resource could be based on a pre-defined priority order. Determining which resource to keep could be based on a pre-defined priority order of the corresponding signal/channel or based on the properties of the resource: E.g., one could keep that resource that is best from a radio perspective (e.g., creating least out-of-band emissions, requiring least backoff, etc.).

Step-by-step, one resource is dropped until transmission is possible. Determining which resource to drop could be based on a pre-defined priority order of the corresponding signal/channel or based on the properties of the resource: E.g., one could drop that resource that makes the combined resources worse from a radio perspective (e.g., creating most out-of-band emissions, requiring highest backoff, etc.). Determining which signals/channels are dropped and which are transmitted (potentially reduced in size) could match which resource has been dropped or be based on pre-defined priority order of signals and channels.

Figure 4:
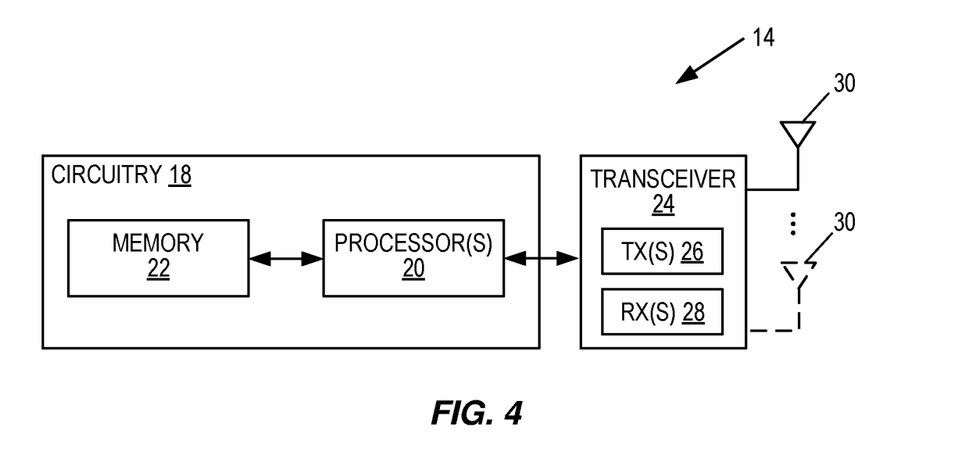
FIGS. 4-8 illustrate example embodiments of radio network nodes according to some embodiments of the present disclosure.
Figure 5:
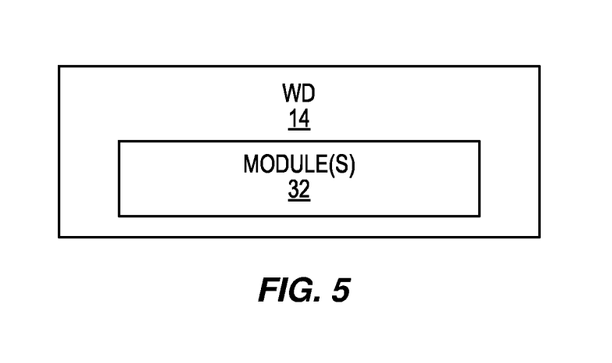

FIGS. 4 and 5 illustrate example embodiments of a wireless device 14 according to some embodiments of the present disclosure.

FIG. 4 is a schematic block diagram of the wireless device 14 (e.g., a UE 14) according to some embodiments of the present disclosure. As illustrated, the wireless device 14 includes circuitry 18 comprising one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some embodiments, the functionality of the wireless device 14 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 14 according to any of the embodiments described herein is provided. For example, in one embodiment, the wireless device 14 may be operable to determine whether a combination of resources for a plurality of signals or channels fulfills a predefined criteria. Upon a determination that the predefined criteria is fulfilled, the wireless device 14 transmits the plurality of signals or channels according to a first transmission strategy in which each of the plurality of signals or channels is transmitted on its respective resource or resources. Upon a determination that the predefined criteria is not fulfilled, the wireless device 14 transmits at least some of the plurality of signals or channels according to a second transmission strategy different from the first transmission strategy.

In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 5 is a schematic block diagram of the wireless device 14 according to some other embodiments of the present disclosure. The wireless device 14 includes one or more modules 32, each of which is implemented in software. The module(s) 32 provide the functionality of the wireless device 14 (e.g., the UE 14) described herein.

Figure 6:
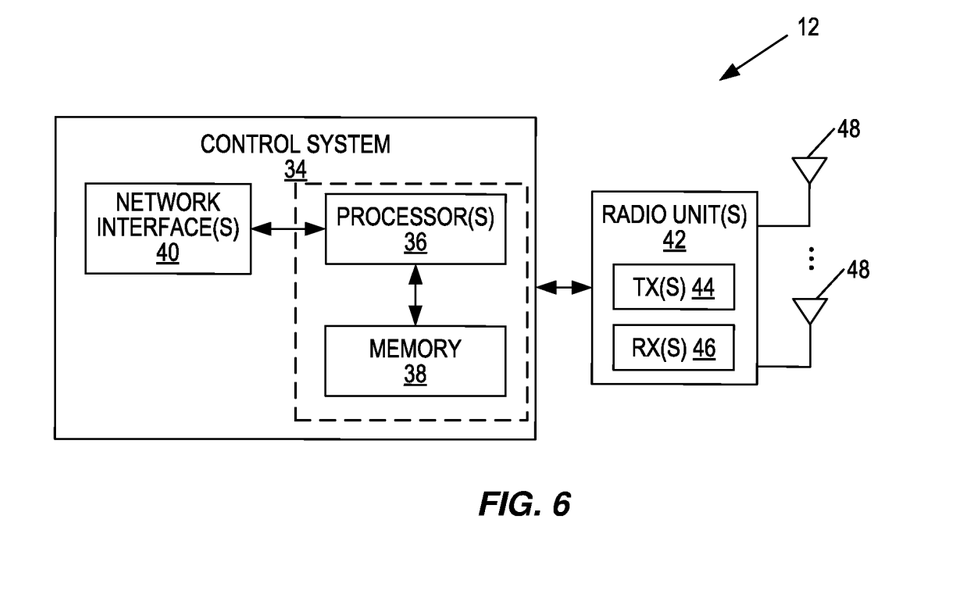
Figure 7:
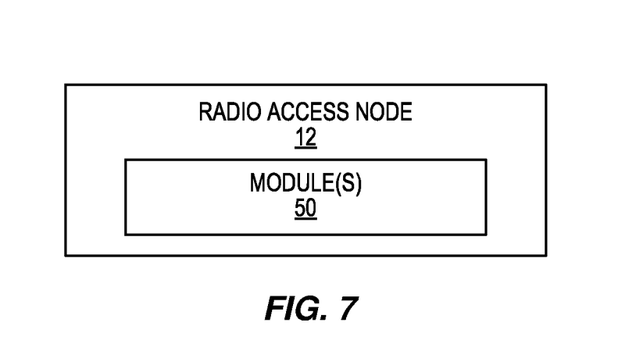
Figure 8:
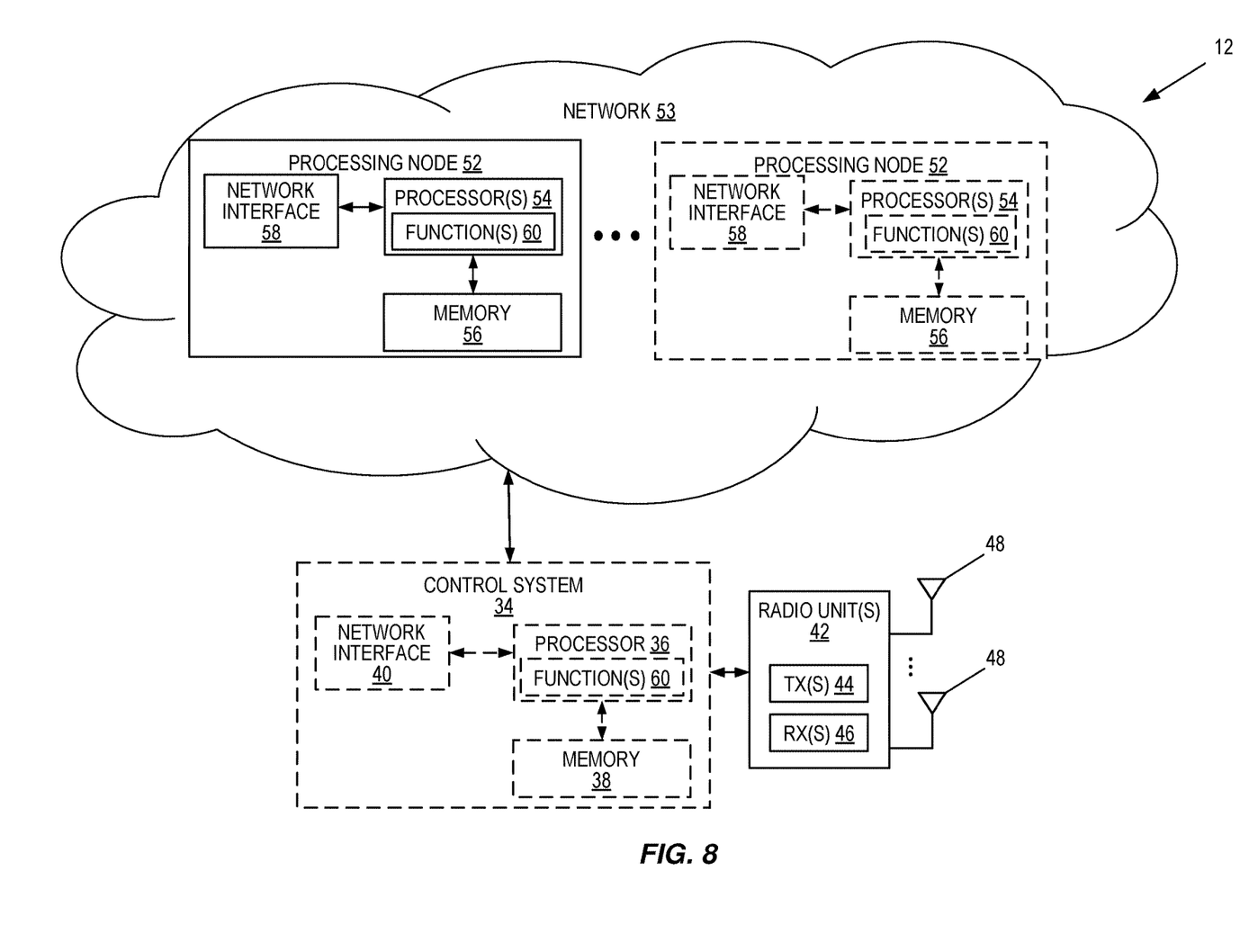

FIGS. 6 through 8 illustrate example embodiments of a radio network node according to some embodiments of the present disclosure.

FIG. 6 is a schematic block diagram of the node 12 according to some embodiments of the present disclosure. Other types of network nodes may have similar architectures (particularly with respect to including processor(s), memory, and a network interface). As illustrated, the radio access node 12 includes a control system 34 that includes circuitry comprising one or more processors 36 (e.g., CPUs, ASICs, FPGAs, and/or the like) and memory 38. The control system 34 also includes a network interface 40. The radio access node 12 also includes one or more radio units 42 that each include one or more transmitters 44 and one or more receivers 46 coupled to one or more antennas 48. In some embodiments, the functionality of the radio access node 12 described above may be fully or partially implemented in software that is, e.g., stored in the memory 38 and executed by the processor(s) 36.

FIG. 7 is a schematic block diagram of the radio access node 12 according to some other embodiments of the present disclosure. The radio access node 12 includes one or more modules 50, each of which is implemented in software. The module(s) 50 provide the functionality of the radio access node 12 (e.g., radio access node 12) described herein.

FIG. 8 is a schematic block diagram that illustrates a virtualized embodiment of the radio access node 12 according to some embodiments of the present disclosure. Other types of network nodes may have similar architectures (particularly with respect to including processor(s), memory, and a network interface). As used herein, a "virtualized" radio access node 12 is a radio access node 12 in which at least a portion of the functionality of the radio access node 12 is implemented as a virtual component (e.g., via a virtual machine(s) executing on a physical processing node(s) in a network(s)). As illustrated, the radio access node 12 optionally includes the control system 34, as described with respect to FIG. 6. The radio access node 12 also includes the one or more radio units 42 that each include the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 52 coupled to or included as part of a network(s) 53 via the network interface 40. Alternatively, if the control system 34 is not present, the one or more radio units 42 are connected to the one or more processing nodes 52 via a network interface(s). Each processing node 52 includes one or more processors 54 (e.g., CPUs, ASICs, FPGAs, and/or the like), memory 56, and a network interface 58.

In this example, functions 60 of the radio access node 12 described herein are implemented at the one or more processing nodes 52 or distributed across the control system 34 (if present) and the one or more processing nodes 52 in any desired manner. In some particular embodiments, some or all of the functions 60 of the radio access node 12 described herein are implemented as virtual components executed by one or more virtual machines implemented in a virtual environment(s) hosted by the processing node(s) 52. As will be appreciated by one of ordinary skill in the art, additional signaling or communication between the processing node(s) 52 and the control system 34 (if present) or alternatively the radio unit(s) 42 is used in order to carry out at least some of the desired functions. Notably, in some embodiments, the control system 34 may not be included, in which case the radio unit(s) 42 communicates directly with the processing node(s) 52 via an appropriate network interface(s).

In some embodiments, a computer program including instructions which, when executed by at least one processor, causes the at least one processor to carry out the functionality of the radio access node 12 or a processing node 52 according to any of the embodiments described herein is provided. For example, in one embodiment, the radio access node 12 may be operable to determine whether a second node 14 will transmit a plurality of signals or channels according to a first transmission strategy in which each of the plurality of signals or channels is transmitted on its respective resource or resources, or whether the second node 14 will transmit one or more signals or channels according to a second transmission strategy different from the first transmission strategy. The radio access node 12 receives the one or more signals or channels from the second node 14, and processes the received one or more signals or channels according to the determined strategy.

In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 9:
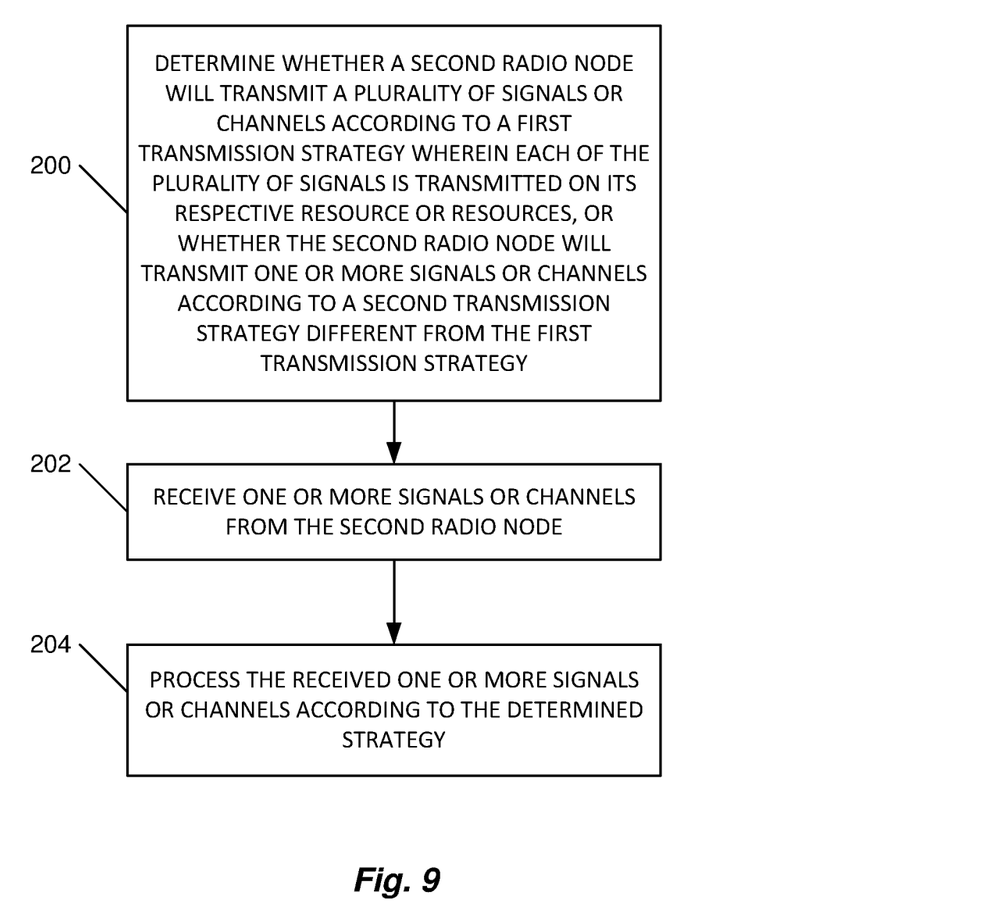
FIG. 9 illustrates a procedure for processing CQI feedback and HARQ feedback according to some embodiments of the present disclosure

FIG. 9 illustrates a procedure for processing CQI feedback and HARQ feedback according to some embodiments of the present disclosure. The process includes, at step 200, determining, at a first radio node, whether a second radio node will transmit a plurality of signals or channels according to a first transmission strategy in which each of the plurality of signals or channels is transmitted on its respective resource or resources, or whether the second radio node will transmit one or more signals or channels according to a second transmission strategy different from the first transmission strategy. At step 202, the first radio node receives the one or more signals or channels from the second radio node. At step 204, the first radio node processes the received one or more signals or channels according to the determined strategy. In one embodiment, the first radio node is a gNB, an eNB, or a base station. In another embodiment, the first radio node is a wireless device, which may be a UE, operating according to a D2D, M2M, or MTC protocol. In one embodiment, the second radio node may be a wireless device that may or may not be operating according to a D2D, M2M, or MTC protocol.

In one embodiment, the plurality of signals or channels comprises a periodic CQI feedback, a HARQ feedback, or both, but the subject matter described herein is not limited to just these signals or channels.

The following acronyms may be used within this disclosure.

3GPP Third Generation Partnership Project
5G Fifth Generation
ACK Acknowledgement
ASIC Application Specific Integrated Circuit
BW Bandwidth
CA Carrier Aggregation
CM Cubic Metric
CPE Customer Premises Equipment
CPU Central Processing Unit
CQI Channel Quality Indicator
CSI Channel State Information
D2D Device-to-Device
DCI Downlink Control Information
DFT Discrete Fourier Transform
DFT-S-OFDM Discrete Fourier Transform Spread Orthogonal Frequency Division Multiplexing
eNB Enhanced or Evolved Node B
FDD Frequency Division Duplexing
FPGA Field Programmable Gate Array
gNB New Radio Base Station
HARQ Hybrid Automatic Repeat Request
IoT Internet of Things
LEE Laptop Embedded Equipped
LME Laptop Mounted Equipment
LTE Long Term Evolution
M2M Machine-To-Machine
MBMS Multimedia Broadcast/Multicast Service
MDT Minimization of Drive Tests
MIMO Multiple Input Multiple Output
MME Mobility Management Entity
MTC Machine Type Communication
NACK Negative Acknowledgement
NR New Radio
OFDM Orthogonal Frequency Division Multiplex
P-GW Packet Data Network Gateway
PAPR Peak to Average Power Ratio
PAPR/CM Peak to Average Power Ratio per Cubic Metric
PUCCH Physical Uplink Control Channel
PUSCH Physical Uplink Shared Channel
RF Radio Frequency
RRC Radio Resource Control
RRH Remote Radio Head
RRU Remote Radio Unit
SC-FDMA Single Carrier Frequency Division Multiple Access
SCEF Service Capability Exposure Function
SINR Signal to Interference plus Noise Ratio
SR Scheduling Request
TCE Trace Collection Entity
TDD Time Division Duplexing
TRP Transmission and Reception Point
UE User Equipment
USB Universal Serial Bus
WD Wireless Device Those skilled in the art will recognize improvements and modifications to the embodiments of the present disclosure. All such improvements and modifications are considered within the scope of the concepts disclosed herein.

What is claimed is:

1. A method of operation of a radio node, the method comprising:
   determining whether a combination of resources for a plurality of signals or channels fulfills a predefined criteria;
   upon a determination that the predefined criteria is fulfilled, transmitting the plurality of signals or channels according to a first transmission strategy wherein each of the plurality of signals or channels is transmitted on its respective resource or resources, wherein one of the predefined criteria is that a normalized span of the combination of resources is below a predefined threshold; and
   upon a determination that the predefined criteria is not fulfilled, transmitting some but not all of the plurality of signals or channels in a single resource according to a second transmission strategy that is different from the first transmission strategy.

2. The method of claim 1, wherein transmitting some but not all of the plurality of signals or channels according to the second transmission strategy comprises transmitting less than all of the plurality of signals or channels on less than all of the resources associated with the plurality of signals or channels.

3. The method of claim 1, wherein transmitting some but not all of the plurality of signals or channels according to the second transmission strategy comprises combining at least some of the plurality of signals or channels and transmitting the combination on less than all of the resources associated with the plurality of signals or channels.

4. The method of claim 1, wherein transmitting some but not all of the plurality of signals or channels according to the second transmission strategy comprises transmitting at least one of the plurality of signals or channels in a reduced or compacted form.

5. The method of claim 1, wherein one of the predefined criteria is that the normalized span of the combination of resources is within a predefined threshold percentage of a normalized User Equipment (UE) bandwidth or carrier bandwidth.

6. The method of claim 1, wherein one of the predefined criteria is that a normalized separation of the combination of resources is below a threshold.

7. A radio node, comprising:
   at least one processor;
   memory comprising instructions executable by the at least one processor whereby the radio node is operable to:
      determine whether a combination of resources for a plurality of signals or channels fulfills a predefined criteria;
      upon a determination that the predefined criteria is fulfilled, transmit the plurality of signals or channels according to a first transmission strategy wherein each of the plurality of signals or channels is transmitted on its respective resource or resources; and
      upon a determination that the predefined criteria is not fulfilled, transmit some but not all of the plurality of signals or channels in a single resource according to a second transmission strategy different from the first transmission strategy, wherein one of the predefined criteria is that a normalized span of the combination of resources is below a predefined threshold.

8. The radio node of claim 7 wherein transmitting some but not all of the plurality of signals or channels according to the second transmission strategy comprises transmitting less than all of the plurality of signals or channels on less than all of the resources associated with the plurality of signals or channels.

9. The radio node of claim 7 wherein transmitting some but not all of the plurality of signals or channels according to the second transmission strategy comprises combining at least some of the plurality of signals or channels and transmitting the combination on less than all of the resources associated with the plurality of signals or channels.

10. The radio node of claim 7 wherein transmitting some but not all of the plurality of signals or channels according to the second transmission strategy comprises transmitting at least one of the plurality of signals or channels in a reduced or compacted form.

11. The radio node of claim 7, wherein one of the predefined criteria is that the normalized span of the combination of resources is within a predefined threshold percentage of a normalized User Equipment (UE) bandwidth or carrier bandwidth.

12. The radio node of claim 7, wherein one of the predefined criteria is that a normalized separation of the combination of resources is below a threshold.

* * * * *